United States Patent [19]

Nemoto et al.

[11] Patent Number: 4,797,699
[45] Date of Patent: Jan. 10, 1989

[54] FOCAL PLANE SHUTTER

[75] Inventors: Ichiro Nemoto; Ko Aosaki; Atsushi Misawa; Takahito Otora, all of Yotsukaido, Japan

[73] Assignee: Seikosha Co., Ltd., Tokyo, Japan

[21] Appl. No.: 146,330

[22] Filed: Jan. 21, 1988

[30] Foreign Application Priority Data

Jan. 21, 1987 [JP] Japan .................................. 62-7218[U]

[51] Int. Cl.⁴ .............................................. G03B 9/40
[52] U.S. Cl. ..................................... 354/246; 354/249; 354/250
[58] Field of Search ............... 354/246, 247, 248, 249, 354/250

[56] References Cited

U.S. PATENT DOCUMENTS

| | | | |
|---|---|---|---|
| 3,864,713 | 2/1975 | Kitai et al. | 354/246 |
| 4,081,810 | 3/1978 | Onda et al. | 354/249 |
| 4,493,544 | 1/1985 | Uematsu | 354/246 |
| 4,560,265 | 12/1985 | Hashimoto | 354/246 |
| 4,657,366 | 4/1987 | Tanabe et al. | 354/249 |

Primary Examiner—A. A. Mathews
Attorney, Agent, or Firm—Bruce L. Adams; Van C. Wilks

[57] ABSTRACT

A focal plane shutter for a camera comprising two sets of parallel blades positioned between the plane of a lens in the camera and the plane of a film set therein and in a parallel relation thereto. These sets of blades are movable in opposite directions between a first position in which they are unfolded to close a shutter aperture and a second position in which they are folded to form a slit to open the shutter aperture. Every two adjoining blades in each set of blades has a smaller overlapping width in their first position than in their second position. This overlapping width in the first position is smaller between two adjoining blades closer to the lens plane than between two adjoining blades closer to the film plane.

3 Claims, 3 Drawing Sheets

FOCAL PLANE SHUTTER

BACKGROUND OF THE INVENTION

1. Field of the Invention

This invention relates to a focal plane shutter for a camera. More particularly, it is a focal plane shutter of the type including two sets of thin lightshielding blades which are adapted to travel across a shutter aperture.

2. Description of the Prior Art

There is known a focal plane shutter comprising a plurality of thin light-shielding blades of which every two adjoining ones overlap each other, and which are successively movable to vary their overlapping width to thereby open and close a shutter aperture. When the blades spread over the shutter aperture to close it, every two adjoining blades are still required to maintain a minimum overlapping width to prevent any passage of light. In order to maintain the minimum effective overlapping width and yet reduce the size of the shutter, it has hitherto been necessary to increase the number of the blades. This increase has added to the total weight of the blades. It has, however, become necessary to reduce the weight of the blades in order to realize a high-speed shutter. In order to reduce the weight of the blades, it has been usual practice to reduce their overlapping width, size, or number. This practice has, however, made it necessary to provide additional light-shielding members, or manufacture the blades with a higher degree of accuracy with respect to warpage or curvature, in order to prevent any passage of light through the shutter aperture when it is closed.

A focal plane shutter of the known construction is shown by way of example in FIGS. 3(a) and 3(b). It includes a base plate 1 having an aperture 1a through which light can be passed to expose a film, and a cover plate 2 lying in parallel to the base plate 1. The base plate 1 and the cover plate 2 define therebetween a space in which a plurality of shutter blades are movable to open and close the aperture 1a. A partition 11 is provided between the base plate 1 and the cover plate 2 for dividing the space therebetween into two section in which two sets of shutter blades are respectively mounted. The cover plate 2 and the partition 11 are substantially equal in shape to the base plate 1 and are supported thereon in a known way not shown. The cover plate 2 has an aperture 2a and the partition 11 also has an aperture 11a. The aperature 2a and 11a are equal in size to the aperature 1a of the base plate 1 and are axially aligned therewith.

The shutter blades consist of a set of blades 3 to 7 which are provided between the base plate 1 and the partition 11 movably for opening the aperature 1a for film exposure, and a set of blades 10 which are provided between the cover plate 2 and the partition 11 for closing the opening 1a. The blades 10 are substantially of the same construction with the blades 3 to 7, but are symmetrical thereto when viewed in a vertical plane.

A pair of arms 8 and 9 are rotatably supported on the base plate 1 by a pin 8a and a pin 9a, respectively. The blades 3 to 7 are rotatably connected to the arm 8 by pins 3b to 7b, respectively, and to the arm 9 by pins 3c to 7c, respectively. The pins 8a and 9a form a pair of parallel links with each of the other pairs of pins, i.e., 7b and 7c, 6b and 6c, 5b and 5c, 4b and 4c, and 3b and 3c.

The film 12 is positioned behind the cover plate 2. A photographic lens not shown is located in front of the base plate 1.

Every adjoining two of the blades 3 to 7 overlap each other to some extent, as shown in FIG. 3(a). The overlapping widths $L_1$, $L_2$, $L_3$ and $L_4$ of the blades 3 and 4, 4 and 5, 5 and 6, and 6 and 7, respectively, are substantially equal to one another. If one of the arms 8 and 9 is rotated, the blades are moved to open the aperature 1a, while maintaining their parallel relationship.

SUMMARY OF THE INVENTION

Under these circumstances, it is an object of this invention to provide a small and high-speed focal plane shutter which does not require any additional light shielding member or any blade manufactured with a particularly high degree of accuracy, but which is very simple in construction.

This object is attained by a focal plane shutter comprising two sets of parallel blades positioned between the plane of a lens in a camera and the plane of a film set therein and in a parallel relation thereto movably in opposite directions between a first position in which they are unfolded to close a shutter aperature and a second position in which they are folded to form a slit to open the shutter aperature every two adjoining blades in each set of lades having a smaller overlapping width in the first position than in the second position, characterized in that the overlapping width in the first position is smaller between two adjoining blades closer to the lens plane than between two adjoining blades closer to the film plane.

The shutter of this invention has a reduced blade overlapping width and yet does not require any additional light-shielding member or any blade manufactured with a particularly high degree of accuracy. It can be composed of smaller blades or a smaller number of blades. The resulting reduction in weight of the blades enables a high shutter speed. The use of smaller blades enables the realization of a smaller shutter. The reduction in number of the blades enables a reduction in the dimensions of the space in which they work, and thereby an improved shutter efficiency, as well as a reduction in cost of shutter production.

BRIEF DESCRIPTION OF THE DRAWINGS

FIG. 2 (a) is a front elevational view of a shutter according to another embodiment of this invention;

FIG. 3 (b) is a vertical sectional view thereof.

DETAILED DESCRIPTION OF THE INVENTION

Figure 1A:
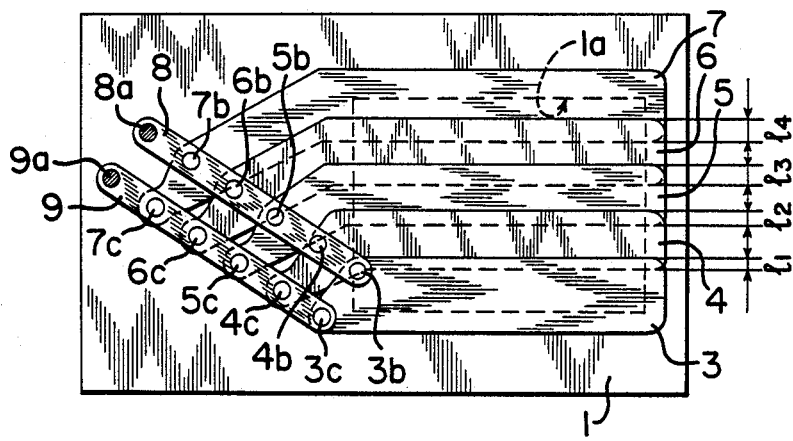
FIG. 1 (a) is a front elevational view of a shutter embodying this invention.
Figure 1B:
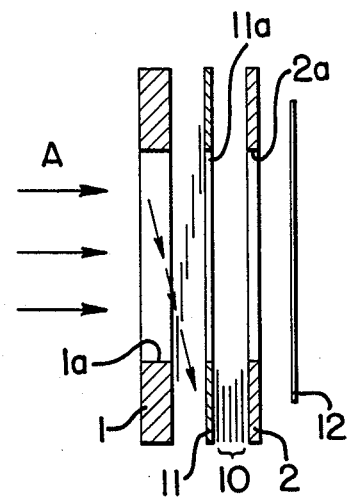

A shutter embodying this invention is shown in FIGS. 1(a) and 1(b). Like numerals are used to indicate like parts throughout FIGS. 1(a) and 1(b) and FIGS. 3(a) and 3(b) showing the prior art which has hereinbefore been described. Therefore, no description of any similar part will hereinafter be repeated.

Figure 3A:
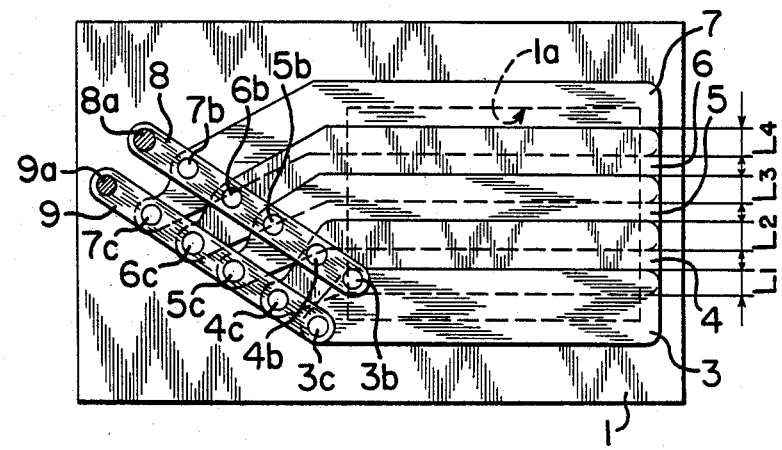
FIG. 3 (a) is a view similar to FIG. 1(a), but showing a known shutter.
Figure 3B:
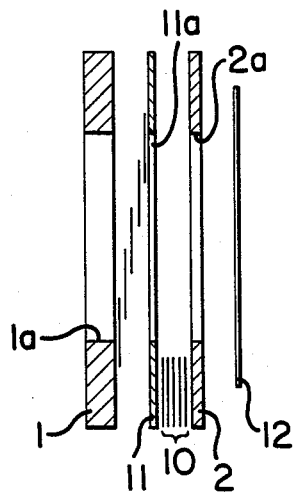

The shutter of this invention is characterized by the varying overlapping width of every two adjoining blades, as is obvious from the comparison of FIGS. 1(a) and 3(a). The blades 3 and 4, which are located closer to the lens plane than any other pair of adjoining blades are, have an overlapping width $L_1$ which is smaller than the overlapping width $L_2$ of the blades 4 and 5. The width $L_2$ is smaller than the overlapping width $L_3$ of the blades 5 and 6. The width $L_3$ is smaller than the overlapping width $L_4$ of the blades 6 and 7 which are located closer to the film plane than any other pair of adjoining blades are. The width $L_4$ is equal to the overlapping width of any two adjoining blades in the known shutter shown in FIG. 3(*a*).

Although the overlapping width $L_1$ of the blades 3 and 4 is smaller than that of any other pair of adjoining blades, the light A passing through the clearance, if any, between the blades 3 and 4 is deflected downwardly as shown in FIG. 1(*b*), and is not allowed to reach the film 12. No undesirable passage of light is likely to occur with any other pair of adjoining blades having a larger overlapping width.

Figure 2A:
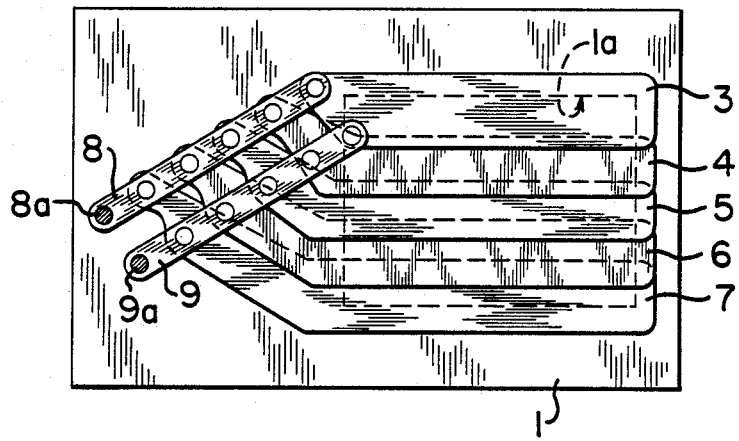
FIG. 2 (b) is a vertical sectional view thereof.
Figure 2B:
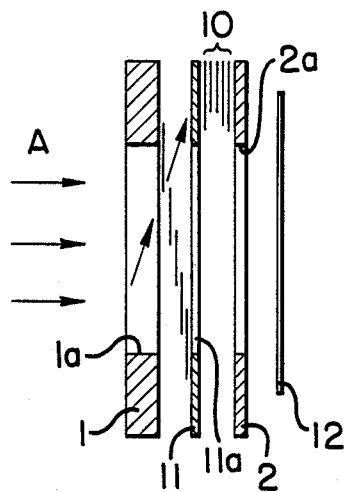

Another embodiment of this invention is shown in FIGS. 2(*a*) and 2(*b*). It is characterized by the different arrangement of the blades 3 to 7 and therefore the second set of blades 10, too. The uppermost blade 7 is now located closer to the lens plane than any of the other blades 3 to 6 is, as is obvious from the comparison of FIGS. 1(*b*) and 2(*b*). The smallest overlapping width is now defined between the blades 6 and 7, as is obvious from the comparison of FIGS. 1(*a*) and 2(*a*). The light A passing through the clearance, if any, between the blades 6 and 7 is deflected upwardly and does not reach the film 12.

Although the invention has been described with reference to the shutter of which the blades are driven by the arms, it is also applicable to a shutter of the type in which the blades are actuated by a rotating ring.

What is claimed is:

1. In a focal plane shutter comprising two sets of parallel blades positioned between the plane of a lens in a camera and the plane of a film set therein and in a parallel relation thereto, said sets of blades being movable in opposite directions between a first position in which they are unfolded to close a shutter aperature and a second position in which they are folded to form a slit to open said aperature every two adjoining blades in each set of blades having a smaller overlapping width in said first position than in said second position, the improvement wherein said overlapping width in said first position is smaller between two adjoining blades closer to said lens plane than between two adjoining blades closer to said film plane.

2. A shutter as set forth in claim 1, wherein said overlapping width in said first position is greater toward the upper edge of said shutter aperature than toward its lower edge.

3. A shutter as set forth in claim 1, wherein said overlapping width in said first position is greater toward the lower edge of said shutter aperature than toward its upper edge.

* * * * *